United States Patent [19]

Minoura

[11] 4,390,235
[45] Jun. 28, 1983

[54] MULTIBEAM SCANNING APPARATUS PROVIDED WITH A FUNCTION OF CHANGING MAGNIFICATION

[75] Inventor: Kazuo Minoura, Yokohama, Japan

[73] Assignee: Canon Kabushiki Kaisha, Tokyo, Japan

[21] Appl. No.: 301,015

[22] Filed: Sep. 10, 1981

[30]   Foreign Application Priority Data

Sep. 18, 1980 [JP]   Japan ............................ 55-130240

[51] Int. Cl.³ .............................................. G02B 27/17
[52] U.S. Cl. ...................................... 350/6.1; 350/6.6
[58] Field of Search ................. 350/6.8, 6.7, 6.5, 6.1, 350/427, 423, 486, 453, 6.6; 250/236, 235; 346/108

[56]   References Cited
U.S. PATENT DOCUMENTS 4,294,506  10/1981  Hattori .................................. 350/6.8

*Primary Examiner*—Jon W. Henry
*Attorney, Agent, or Firm*—Fitzpatrick, Cella, Harper & Scinto

[57]   ABSTRACT

A multibeam scanning apparatus capable of changing magnification is is provided with a light source part, an afocal zoom lens, a first anamorphic optical system and a second anamorphic optical system. The light source part generates a plural number of collimated light beams and the afocal zoom lens changes the angular magnification of the collimated light beams. The first anamorphic optical system forms linear images from the beams transmitted through the afocal zoom lens. The linear images are parallel with the plane defined by the light beams as deflected by a deflector. The second anamorphic optical system is disposed between the deflector and a surface to be scanned to form good scanning spots on the scanned surface from the linear images on the reflecting surface of the deflector.

3 Claims, 8 Drawing Figures

MAGNIFICATION: 1/3

$\theta' = \dfrac{\theta}{3}$

MAGNIFICATION: 1/6

$\theta' = \dfrac{\theta}{6}$

MAGNIFICATION: 1/9

$\theta' = \dfrac{\theta}{9}$

MULTIBEAM SCANNING APPARATUS PROVIDED WITH A FUNCTION OF CHANGING MAGNIFICATION

BACKGROUND OF THE INVENTION

1. Field of the Invention

The present invention relates to a scanning apparatus for scanning a surface with a plural number of beam spots modulated independently of each other.

2. Description of Prior Art

In recent years there have been proposed various apparatus, for recording or reading data, that employs a light beam. In many of these known apparatus, the beam of light is deflected by a deflector and a surface to be scanned is scanned by a beam spot formed from the deflected beam. To increase the scanning efficiency of the scanning apparatus, it is also known to scan the surface with a plural number of beams at the same time. For such type of scanning apparatus using a plural number of beams it is often required to change the projection magnification with which the light beams are projected on the suface to be scanned. For example, if data are recorded on a photosensitive recording medium by such scanning apparatus, it is often required to change the size of the character to be recorded. An example of such scanning apparatus capable of changing projection magnification of light beams is disclosed in Japanese Patent Application Laid-Open No. Sho54-94053. This prior art scanning apparatus is shown in FIGS. 1A and 1B for the sake of reference in which FIG. 1A is a plan view thereof and FIG. 1B is a side development of the same.

In FIGS. 1A and 1B, reference numeral 1 designates a laser light source and 2 is a ultrasonic element for modulating and deflecting the incident light. 3 is a variable beam reforming lens system and 4 is a rotary polygonal mirror. The rotation axis of the polygonal mirror 4 extends in the direction normal to the plane of the paper, that is, in the direction parallel to Y-axis. 5 is a condenser lens for condensing the beams of light reflected by the polygonal mirror 4. 6 is a surface on which the beam is to be projected. 7 designates a high frequency driving electrical signal for the photo modulating element 2. The electrical signal contains different frequency components.

The beam of light emitted from the laser light source 1 is directed to the photo modulating element 2 driven by the driving electrical signal. In the photo modulating element 2, the beam is divided into a plural number (N) of beams in the Y-Z plane and the divided beam passes through the magnification variable beam reforming lens system 3. Thereafter, the beams are deflected by the rotary polygonal mirror 4 toward the condenser lens 5 through which the beams of light are condensed on the projection plane 6.

In the above system, change of magnification is attained by changing the scanning line space and the scanning line direction by changing the projection magnification of the magnification variable beam reforming lens system 3 and the input signal to the modulation element 2 respectively. However, this prior art scanning system has a drawback.

In the above system, the beam expansion in the direction normal to the deflection scan plane, that is, the beam expansion in the direction of the Y axis of the beams incident on the reflecting surfaces of the polygonal mirror becomes larger with increasing the projection magnification. It requires a large polygonal mirror. This is contrary to the desire for high speed rotation of polygonal mirror and therefore contrary to the desire for speed-up of scanning. Also, in the scanning system, a photo modulating element 2 is used to obtain a plural number of light beams. If there is used, as the light source part 1, a light source in the form of array such as semiconductor laser array or light emitting diode array which have been developed rapidly in recent years, then the expansion of the incident beams on the deflection reflecting surface of the polygonal mirror becomes larger also in the direction of deflection scan plane, that is, in X-Z plane. This also requires a larger rotary polygonal mirror which is contrary to the desire for high speed of scanning as described above.

SUMMARY OF THE INVENTION

Accordingly, it is an object of the invention to provide a scanning apparatus for scanning a surface with a plural number of beam spots which permits high speed operation of the deflector even when the apparatus is provided with a function to change magnification.

It is another object of the invention to provide such multibeam scanning apparatus which has the capability to change magnification and assures high speed operation of a deflector even when a light source in the form of an array is used as its light source part.

It is a further object of the invention to provide such multibeam scanning apparatus which is compact in structure and has the capability to change magnification while maintaining high speed operation of beam deflection.

To attain the objects according to the invention there is provided a scanning apparatus comprising a light source part for generating a plural number of collimated light beams; an afocal zoom lens for changing the angular magnification of the collimated beams coming from the light source part; a first anamorphic optical system for focusing the respective beams on the reflecting surface of a deflector with respect to beam components running in the direction normal to the deflection scan plane which the light beams deflected by the deflector form with time; and a second anamorphic optical system disposed between the deflector and a surface to be scanned for condensing the deflected beams by the deflector on the surface to be scanned.

With such an arrangement, the light beams from the afocal zoom lens are made incident on the reflecting surface of the deflector as linear images under the action of the first anamorphic optical system, as compared with the prior art apparatus in which the light beams are made incident on the reflecting surface of the deflector as beam spots of the collimated beams. Therefore, the present invention permits use of a deflector having a smaller reflecting surface than that in the prior art apparatus. The provision of the first and second anamorphic optical systems in accordance with the invention also makes it possible to correct the variation in position of the scanning spots caused by any falling-down of the reflecting surface of the deflector.

In the scanning apparatus according to the invention there may be used with advantage, as the light source part, a light source in the form of an array such as a semiconductor laser array or light emitting diode array. When such array form of light source is used, the necessary size of the deflection reflecting surface may be reduced as measured in the direction of deflection scanning by using an anamorphic afocal zoom lens as the above mentioned afocal zoom lens. In this case, this anamorphic afocal zoom lens has such power as to change the scanning line pitch on the surface to be scanned. But, it does not change the distance between the respective beam spots in the direction of scanning lines. In other words, this anamorphic afocal zoom lens is a zoom lens which has a power solely in the direction normal to the plane of deflection scan by the deflector. The use of such anamorphic system for the zoom lens provides an advantage as compared with the case wherein the afocal zoom lens is composed of a spherical lens system. The advantage is that the angular magnification of the zoom lens can be increased while limiting the expansion of light beams on the reflecting surface of the deflector which in turn makes it possible to use a smaller deflector as compared with the prior art apparatus.

Other and further objects, features and advantages of the invention will appear more fully from the following description.

DESCRIPTION OF THE PREFERRED EMBODIMENTS

Figure 1A:
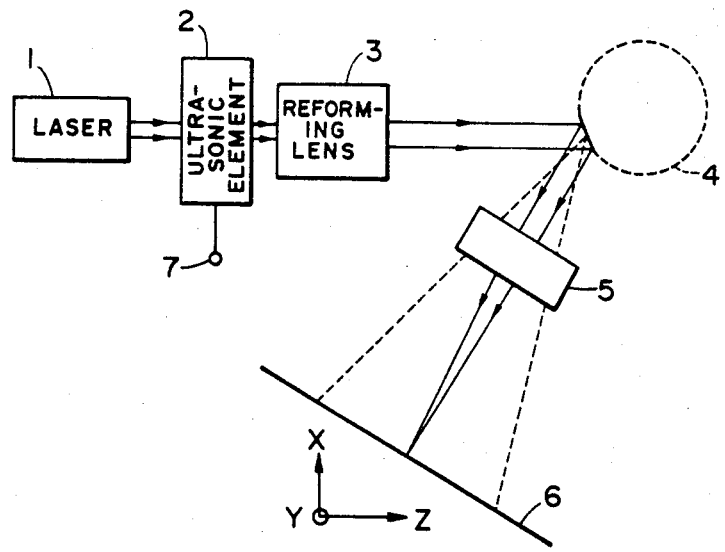
FIGS. 1A and 1B illustrate a multibeam scanning apparatus having a function of changing magnification according to the prior art.
Figure 1B:
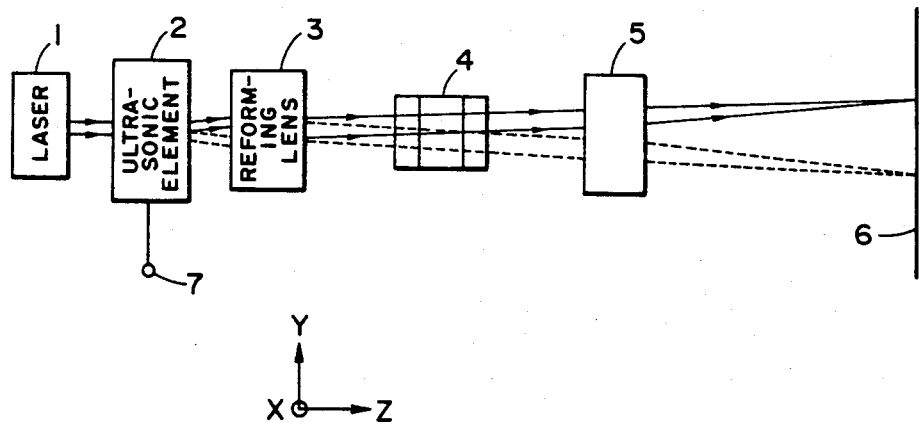
Figure 2:
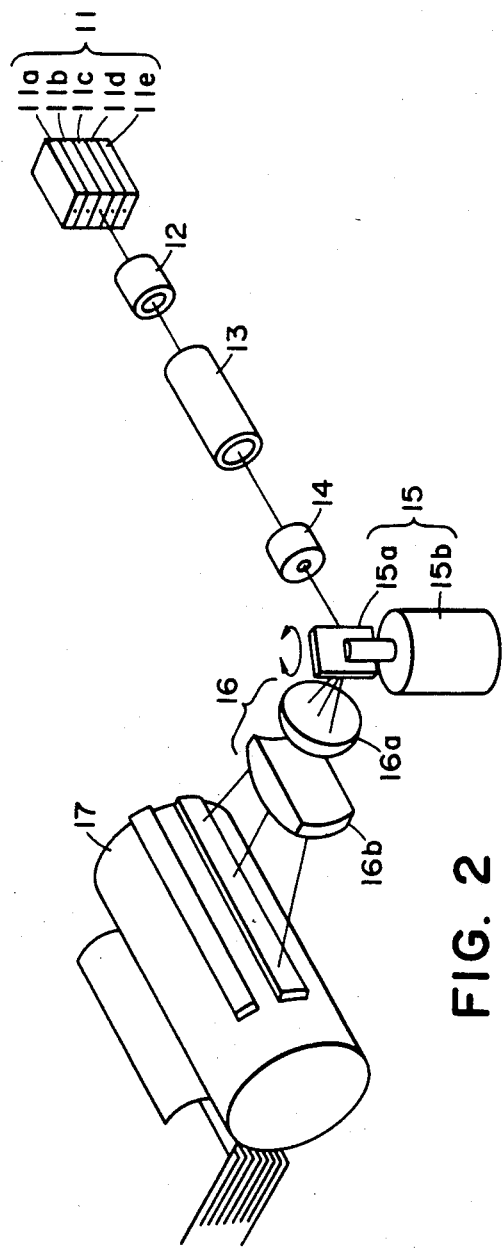
FIG. 2 schematically shows an embodiment of the scanning apparatus according to the present invention.

FIG. 2 shows an embodiment of the invention in which the scanning apparatus according to the invention is incorporated in a printer.

A light source in the form of an array generally designated by 11 comprises a plural number of individual light emitting elements 11a–11e. Light beams emitted from the individual light emitting elements are collimated by a collimator lens 12. After passing through the collimator lens 12, each the beam of light enters an afocal zoom lens 13 by which the angular magnification of the light beam is changed to a selected value. 14 is a cylindrical lens system and 15 is a deflector. The cylindrical lens system 14 is disposed with its bus line extending in parallel with the plane of deflection scan of light beams by the deflector 15. 15b is a driving system for the deflector 15 and has a deflection reflecting surface 15a mounted thereon. Designated by 16 is a scanning lens system that includes a spherical lens 16a and a toroidal lens 16b. 17 is a photosensitive drum surface which is, in the illustrated embodiment, the surface to be scanned. Within a plane intersecting the deflection scan plane at right angles, the photosensitive drum surface 17 is optically conjugated with the reflecting surface 15a of the deflector 15.

If the distance between adjacent light emitting points in the light source in the form of an array is sufficiently small or if the size of a character or picture to be recorded is suitable for it, the individual light emitting elements of the array forming the light source may be arranged in a plane intersetting the deflection scan plane at right angles as shown in FIG. 2. Beams of light emitted from the array light source 11 are collimated by the collimator lens and then enter the afocal zoom lens 13 which produces a desired exit angle and beam diameters of the collimated light beams. These light beams are focused linearly on the deflection reflecting surface 15a of the deflector 15. The direction of these linear images on the reflecting surface is parallel to the deflection scan plane which the light beams deflected by the deflector form with time. The light beams deflected by the deflection reflecting surface 15a are focused on the photosensitive drum surface 17 through the anamorphic scanning lens system 16.

Figure 3:
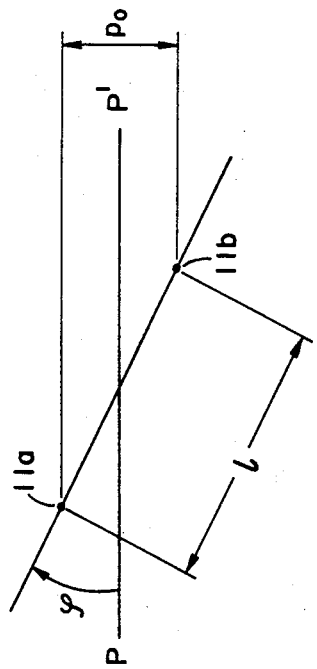
FIG. 3 is a view for illustrating the use of a light source in the form of an array as the light source part of the scanning apparatus.

In general, a light source in the form of an array is difficult to manufacture and at present it is impossible to obtain a highly integrated light source in the form of an array. In addition, if the array of light source elements is arranged normally to the deflection scan plane as shown in FIG. 2 considering the focus magnifications of the optical system used in the scanning apparatus, the pitch interval between neighbouring scanning lines on the scanned surface becomes too large to be acceptable. To solve the problem, such light source in the form of an array has usually been disposed at an incline at a certain angle of $\phi$ relative to the deflection scan plane as shown in FIG. 3. Namely, in use of such array forming the light source, the direction of the array of light emitting elements is inclined by an angle of $\phi$ relative to the deflection scan plane. In FIG. 3, 11a and 11b are two neighbouring light emitting points in the array and l is the distance between the two light emitting points. P-P' indicates the deflection scan plane. Since the line formed by the array of light emitting points is inclined by an angle of $\phi$ relative to the deflection scan plane P-P', the apparent distance Po between the two light emitting points 11a and 11b is given by:

$$Po = l \cdot \sin \phi$$

Obviously, the apparent distance Po is shorter than the real distance l. In this manner, by inclining the line formed by the array, the distance l between two neighbouring light points really existing in the array can be reduced to a value Po shorter than l. However, if there is used in the scanning apparatus according to the invention such light sources in the form of an array disposed inclined in the above manner, then the light beams will expand on the reflecting surface of the deflector in the direction of deflection scanning. In case that the afocal zoom lens 13 is composed of a spherical lens system, the expansion of light beams becomes larger with increasing the angular magnification of the afocal zoom lens 13. Such expansion of light beams must be mitigated by any effective means. Otherwise, the deflector needs to have a larger reflecting surface. According to the invention, such mitigation is attained by using an anamorphic afocal zoom lens 13 which has no power in a certain direction. By doing so, a small reflecting surface may be used even when the magnification is changed while using an inclined array of light sources as described above. The anamorphic afocal zoom lens 13 used in this case has a power solely within a plane normal to the deflection scan plane so that it can change the pitch interval between scanning lines on the scanned surface but has no effect to change the magnification in the direction of scanning line. Therefore, within the reflecting surface of the deflector, the expansion of a beam spot in the direction of deflection scanning remains constant irrespective of change of magnification.

Figure 4A:
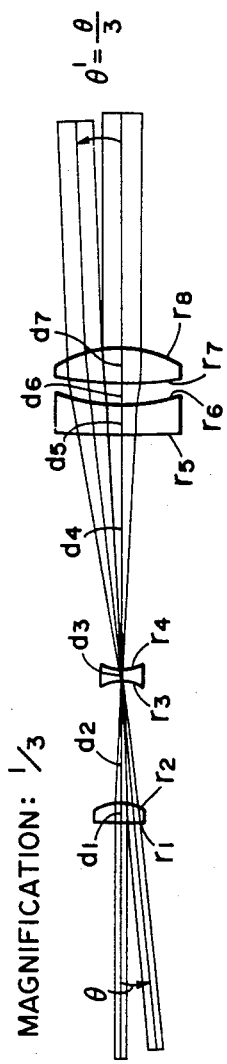
FIGS. 4A to 4C show in sectional views, an embodiment of the anamorphic afocal zoom lens used in the scanning apparatus according to the invention.
Figure 4B:
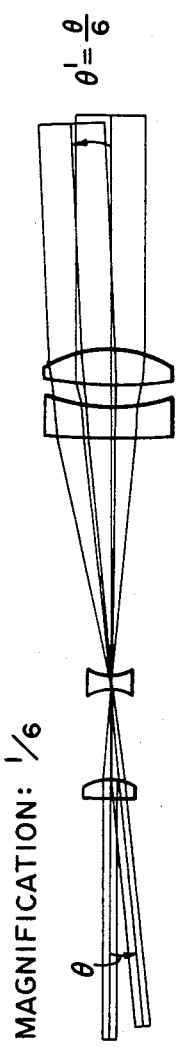
Figure 4C:
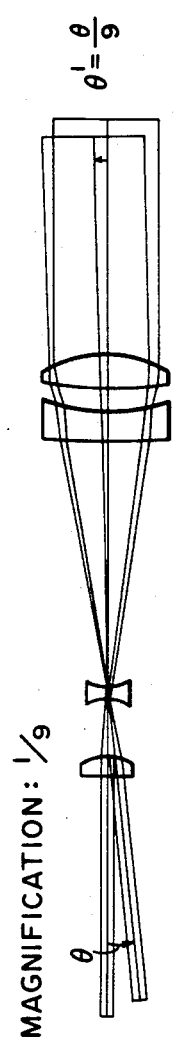

FIGS. 4A to 4C show an embodiment of such anamorphic afocal zoom lens. The lens system is composed of three lens groups of which the first group is stationary and the second one is movable. FIGS. 4A, 4B and 4C are cross-sectional views of the lens system taken on a plane intersecting the deflection scan plane at right angles, showing only the optical path relating to two light beams for the sake of illustration. In the position shown in FIG. 4A, the two beams are incident on the lens system forming an angle of $\theta$ with the optical axis and exit from the lens system forming an angle of $\theta' = \theta/3$. In the position shown in FIG. 4B, the two beams are incident on the lens system forming the same angle, $\theta$ with the optical axis and exit from it with $\theta' = \theta/6$. In the position of the lens system shown in FIG. 4C, the two beams exit from the lens system with $\theta' = \theta/9$.

Figure 5:
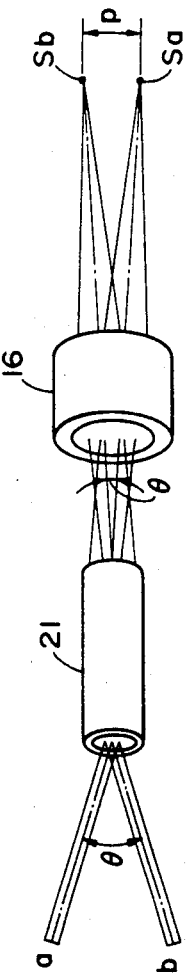
FIG. 5 illustrates the manner of changing of the angular magnification of collimated beams by the anamorphic afocal zoom lens.

FIG. 5 illustrates the action of such an anamorphic afocal zoom lens as shown in FIGS. 4A to 4C.

In FIG. 5, reference numeral 21 designates the afocal anamorphic zoom lens system. a and b are two beams of light coming from a collimator lens and incident on the lens system 21. $\theta$ is the angle the two beams form before entering the lens system 21 and $\theta'$ is the angle the two beams form after exiting from it. As shown in FIG. 5, the afocal anamorphic zoom lens system 21 has an action to convert the angle $\theta$ between two beams a and b to $\theta'$. After the anamorphic zoom lens system 21 there is disposed the deflector 15 which is not shown in FIG. 5 for the purpose of simplification of illustration.

When the above two beams emerging from the lens system 21 with an angle of $\theta'$ therebetween are directed to a scanning lens 16 as shown in FIG. 5, there will be formed two beam spots Sa and Sb on the focal plane of the scanning lens 16. Let P denote the distance between the two spots Sa and Sb, and f the focal length of the scanning lens 16 in the direction perpendicular to the deflection scan plane. Then, $$P = f\theta' = rf\theta \tag{1}$$

wherein, r is the angular magnification of the anamorphic zoom lens system 21, with $r = \theta'/\theta$.

This angular magnification r is the parameter by which the size of the recorded image is determined. The value of r can be selected by moving the second group of three lens groups constituting the above lens system 21.

As described above, the lens system 21 has a function to change the angular magnification. Simultaneously with the change of angular magnification, the beam diameter of the exit beam is also changed automatically. Let $\phi$ denote the beam diameter of the incident beam on the above lens system 21 and $\phi'$ denote that of the exit beam from it. Then, $$r = \phi/\phi' \tag{2}$$

Further, referring to FIG. 5, let $\phi s$ denote the spot size of the focused spot Sa or Sb resulting from the incident beam of $\phi'$ in beam diameter on the scanning lens 16. Then, $$\phi s = K/\phi' \text{ (K is a constant)} \tag{3}$$

From the above equations (2) and (3), $$\phi s = K'r \ (K' = K/\theta: \text{constant}) \tag{4}$$

This equation specifies that the spot size is proportional to the angular magnification of the above lens system 21. Thus, change of spot diameter is effected simultaneously with the change of the size of the recorded image.

While a detailed explanation has been made of an anamorphic afocal zoom lens system, it is obvious that the above explanation is also applicable to the case where the afocal zoom lens 13 is a spherical system.

To further illustrate the afocal anamorphic zoom lens 21 shown in FIG. 4, the following examples are given. Of course, the values given in the following examples are applicable to a spherical lens system to obtain the corresponding afocal zoom lenses.

In all the following examples, ri is radius of curvature of the i-th surface; di is lens thickness on axis or air distance on axis between the i-th and (i+1)-th surfaces; n is refractive index of glass material to wavelength of $0.85\mu$ and n' is that to wavelength of $0.6328\mu$; and $\nu d$ is Abbe's number of glass material.

EXAMPLE 1

| | | | |
|---|---|---|---|
| $r_1 = 7.105$ | | | |
| | $d_1 = 3.0$ | $n_1 = 1.50938,$ | $n'_1 = 1.51462$ |
| $r_2 = 26.020$ | | | $\nu d_1 = 64.15$ |
| | $d_2 = $ variable | | |
| $r_3 = -14.477$ | | | |
| | $d_3 = 2.0$ | $n_2 = 1.72079,$ | $n'_2 = 1.73541$ |
| $r_4 = 5.571$ | | | $\nu d_2 = 27.79$ |
| | $d_4 = $ variable | | |
| $r_5 = 2243.140$ | | | |
| | $d_5 = 4.0$ | $n_3 = 1.74048,$ | $n'_3 = 1.75607$ |
| $r_6 = 82.076$ | | | $\nu d_3 = 26.55$ |
| | $d_6 = 3.686$ | | |
| $r_7 = 166.081$ | | | |
| | $d_7 = 5.0$ | $n_4 = 1.50938,$ | $n'_4 = 1.51462$ |
| $r_8 = -37.369$ | | | $\nu d_4 = 64.15$ |

EXAMPLE 2

| | | | |
|---|---|---|---|
| $r_1 = 30.042$ | | | |
| | $d_1 = 3.0$ | $n_1 = 1.50938,$ | $n'_1 = 1.51462$ |
| $r_2 = -46.898$ | | | $\nu d_1 = 64.15$ |
| | $d_2 = $ variable | | |
| $r_3 = -22.380$ | | | |
| | $d_3 = 2.0$ | $n_2 = 1.78173,$ | $n'_2 = 1.79883$ |
| $r_4 = 4.095$ | | | $\nu d_2 = 25.43$ |
| | $d_4 = $ variable | | |
| $r_5 = 1593.260$ | | | |
| | $d_5 = 4.0$ | $n_3 = 1.78173$ | $n'_3 = 1.79883$ |
| $r_6 = 44.207$ | | | $\nu d_3 = 25.43$ |
| | $d_6 = 4.065$ | | |
| $r_7 = 86.711$ | | | |
| | $d_7 = 6.0$ | $n_4 = 1.54029,$ | $n'_4 = 1.54587$ |
| $r_8 = -24.734$ | | | $\nu d_4 = 62.83$ |

EXAMPLE 3

| | | | |
|---|---|---|---|
| $r_1 = 82.755$ | | | |
| | $d_1 = 3.0$ | $n_1 = 1.50938,$ | $n'_1 = 1.51462$ |
| $r_2 = -18.784$ | | | $\nu d_1 = 64.15$ |
| | $d_2 = $ variable | | |
| $r_3 = -5.390$ | | | |
| | $d_3 = 2.0$ | $n_2 = 1.78173,$ | $n'_2 = 1.79883$ |
| $r_4 = 6.735$ | | | $\nu d_2 = 25.43$ |
| | $d_4 = $ variable | | |

-continued

| | | | |
|---|---|---|---|
| $r_5 = 147.375$ | | | |
| | $d_5 = 5.0$ | $n_3 = 1.78173,$ | $n'_3 = 1.79883$ |
| $r_6 = 29.793$ | | | $vd_3 = 25.43$ |
| | $d_6 = 3.802$ | | |
| $r_7 = 43.888$ | | | |
| | $d_7 = 5.854$ | $n_4 = 1.54029,$ | $n'_4 = 1.54587$ |
| $r_8 = -24.649$ | | | $vd_4 = 62.83$ |

EXAMPLE 4

| | | | |
|---|---|---|---|
| $r_1 = -25.391$ | | | |
| | $d_1 = 3.0$ | $n_1 = 1.50938,$ | $n'_1 = 1.51462$ |
| $r_2 = -9.876$ | | | $vd_1 = 64.15$ |
| | $d_2 =$ variable | | |
| $r_3 = -4.107$ | | | |
| | $d_3 = 2.0$ | $n_2 = 1.78173$ | $n'_2 = 1.79883$ |
| $r_4 = 6.636$ | | | $vd_2 = 25.43$ |
| | $d_4 =$ variable | | |
| $r_5 = 196.208$ | | | |
| | $d_5 = 5.0$ | $n_3 = 1.78173,$ | $n'_3 = 1.79883$ |
| $r_6 = 21.393$ | | | $vd_3 = 25.43$ |
| | $d_6 = 3.347$ | | |
| $r_7 = 37.269$ | | | |
| | $d_7 = 6.656$ | $n_4 = 1.54029,$ | $n'_4 = 1.54587$ |
| $r_8 = -17.394$ | | | $vd_4 = 62.83$ |

EXAMPLE 5

| | | | |
|---|---|---|---|
| $r_1 = 7.445$ | | | |
| | $d_1 = 2.0$ | $n_1 = 1.70900,$ | $n'_1 = 1.72309$ |
| $r_2 = 4.226$ | | | $vd_1 = 28.46$ |
| | $d_2 =$ variable | | |
| $r_3 = -165.603$ | | | |
| | $d_3 = 5.0$ | $n_2 = 1.50938,$ | $n'_2 = 1.51462$ |
| $r_4 = -39.892$ | | | $vd_2 = 64.15$ |
| | $d_4 = 1.0$ | | |
| $r_5 = 94.170$ | | | |
| | $d_5 = 5.0$ | $n_3 = 1.50938,$ | $n'_3 = 1.51462$ |
| $r_6 = -128.497$ | | | $vd_3 = 64.15$ |
| | $d_6 =$ variable | | |
| $r_7 = 52.340$ | | | |
| | $d_7 = 5.0$ | $n_4 = 1.63295,$ | $n'_4 = 1.64379$ |
| $r_8 = 21.460$ | | | $vd_4 = 33.80$ |

Values of variable air distance on axis in the above examples are as follows:

| Angular magnification | Example 1 | | Example 2 | | Example 3 | |
|---|---|---|---|---|---|---|
| | $d_2$ | $d_4$ | $d_2$ | $d_4$ | $d_2$ | $d_4$ |
| ⅓ | 6.885 | 82.700 | 23.568 | 49.006 | 20.592 | 39.335 |
| 1/6 | 4.313 | 88.281 | 17.139 | 50.435 | 15.234 | 40.525 |
| 1/9 | 1.742 | 90.141 | 10.711 | 50.911 | 9.877 | 40.922 |

| Angular magnification | Example 4 | | Example 5 | |
|---|---|---|---|---|
| | $d_2$ | $d_4$ | $d_2$ | $d_4$ |
| ⅓ | 22.220 | 28.268 | 78.989 | 41.037 |
| 1/6 | 16.862 | 29.108 | 126.836 | 12.089 |
| 1/9 | 11.505 | 29.388 | 174.683 | 2.440 |

In the scanning apparatus according to the invention, the magnification in the scanning direction of the scanning line is controlled by electrical means for changing the modulation signal or by mechanical means for controlling the rotational speed of the deflection reflecting surface of the deflector irrespective of whether the magnification changing lens system then used is an afocal zoom lens or an anamorphic afocal zoom lens.

Further, with respect to the anamorphic scanning lens system 16, the following points should be noted:

When the zoom lens is an afocal zoom lens of spherical system, the anamorphic scanning lens system 16 has to have such focal length within the deflection scan plane which is able to focus the beam component parallel to the deflection scan plane on the surface to be scanned in cooperation with the afocal zoom lens.

When the zoom lens is an anamorphic afocal zoom lens, the scanning lens system 16 has to have such focal length which is able to focus the collimated beams on the surface to be scanned.

What I claim is:

1. A scanning apparatus for scanning a surface with a plural number of beam spots independently modulated at the same time, said apparatus comprising:
    a light source for producing a plural number of light beams that are independently collimated;
    a deflector having at least one reflecting surface for deflecting said light beams from said light source part in selected directions;
    an afocal magnification changing optical system disposed between said light source part and said deflector for changing the angular magnification of said collimated beams;
    a first anamorphic optical system disposed between said magnification changing optical system and said deflector for focusing on said reflecting surface of said deflector the components of said light beams which are normal to the deflection scan plane that the light beams deflected by said deflector define with time; and
    a second anamorphic optical system for maintaining said reflecting surface of said deflector and said scanned surface in an optically conjugated relation with each other in a plane normal to said deflection scan plane and for focusing said light beams deflected by said deflector on said scanned surface.

2. A scanning apparatus as set forth in claim 1, wherein said second anamorphic optical system comprises a single spherical lens and a single toroidal lens arranged in this order as viewed from the side of said deflector.

3. A scanning apparatus for scanning a surface with a plural number of beam spots independently modulated at the same time, said apparatus comprising:
    a light source comprising an array of light emitting parts each for emitting a light beam;
    optical means for collimating the respective beams from said array of light emitting parts;
    a deflector having at least one reflecting surface for deflecting said plural number of beams in selected directions;
    an anamorphic afocal magnification changing optical system disposed between said optical means and said deflector for changing the angular magnification of said collimated beams coming from said optical means, said magnification changing optical system having a power which effects the image forming operation of said light beams only in a plane normal to the deflection scan plane which the light beams deflected by said deflector define with time;
    a first anamorphic optical system disposed between said anamorphic afocal magnification changing optical system and said deflector for focusing on said reflecting surface of said deflector the components of said light beams which are normal to said deflection scan plane; and
    a second anamorphic optical system for maintaining said reflecting surface of said deflector and said scanned surface in an optically conjugated relation with each other in a plane normal to said deflection scan plane and for focusing said light beams deflected by said deflector on said scanned surface.

* * * * *